Nov. 11, 1924.
J. W. MILLARD
VEHICLE BRAKE MECHANISM
Filed June 20, 1924 6 Sheets-Sheet 1
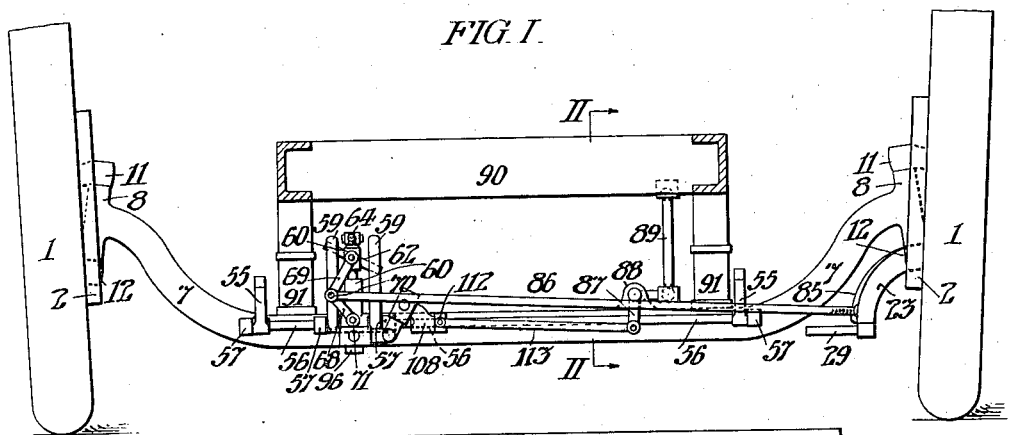
FIG. I.
FIG. II.
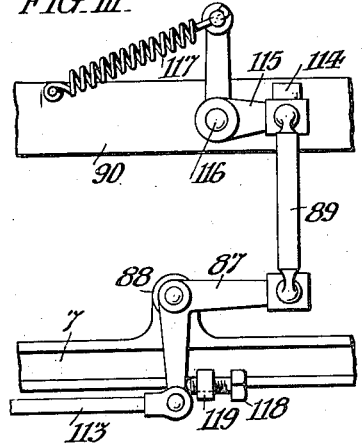
FIG. III.
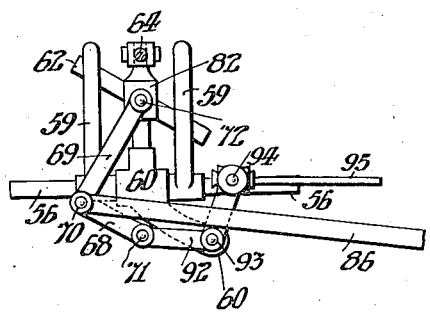
FIG. IV.
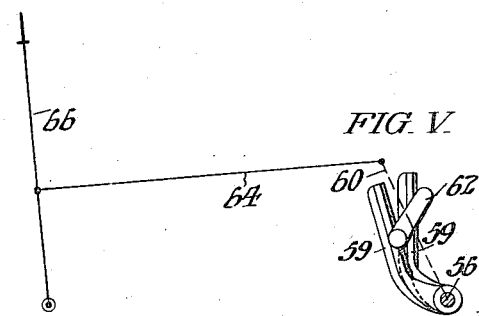
FIG. V.
Inventor:
JOHN WARREN MILLARD,

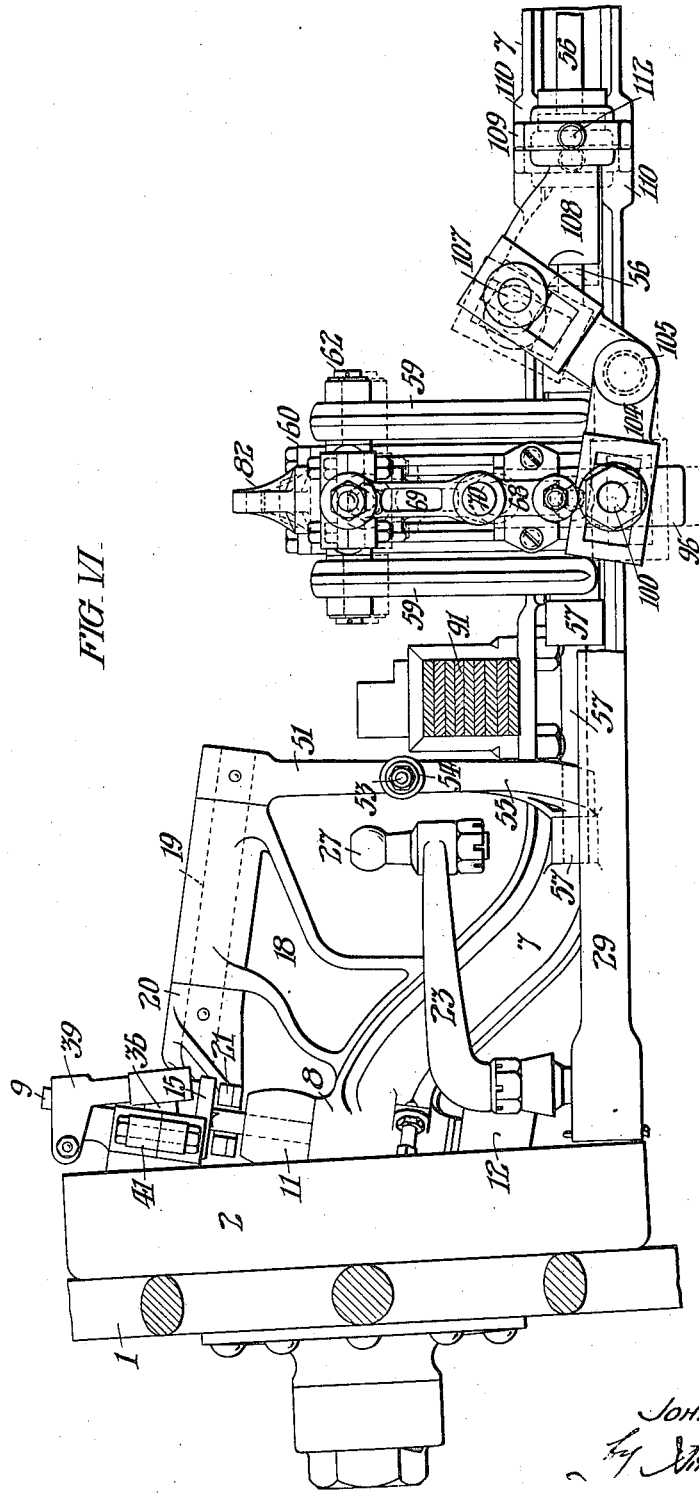

Nov. 11, 1924.
J. W. MILLARD
1,515,310
VEHICLE BRAKE MECHANISM
Filed June 20, 1924     6 Sheets-Sheet 3
FIG. VII.
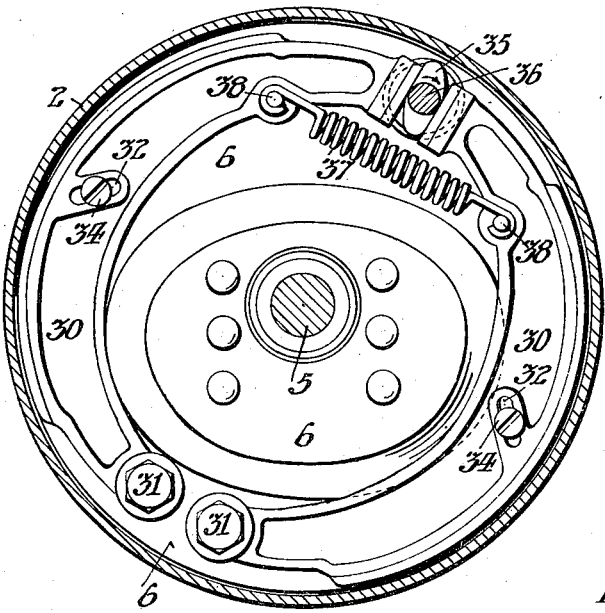
FIG. XXIII.
FIG. VIII.
FIG. XXII.
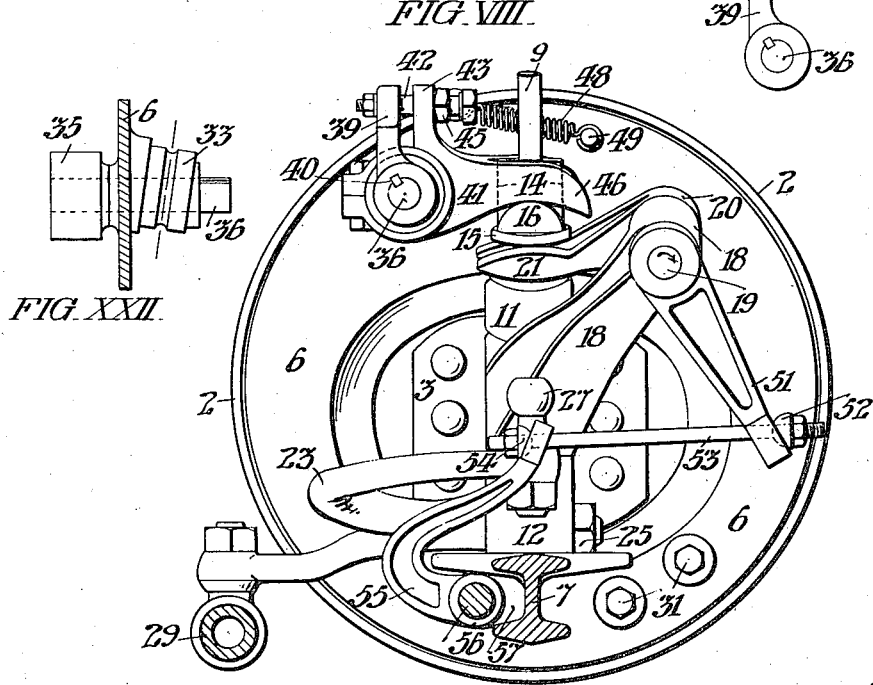
Inventor:
JOHN WARREN MILLARD,

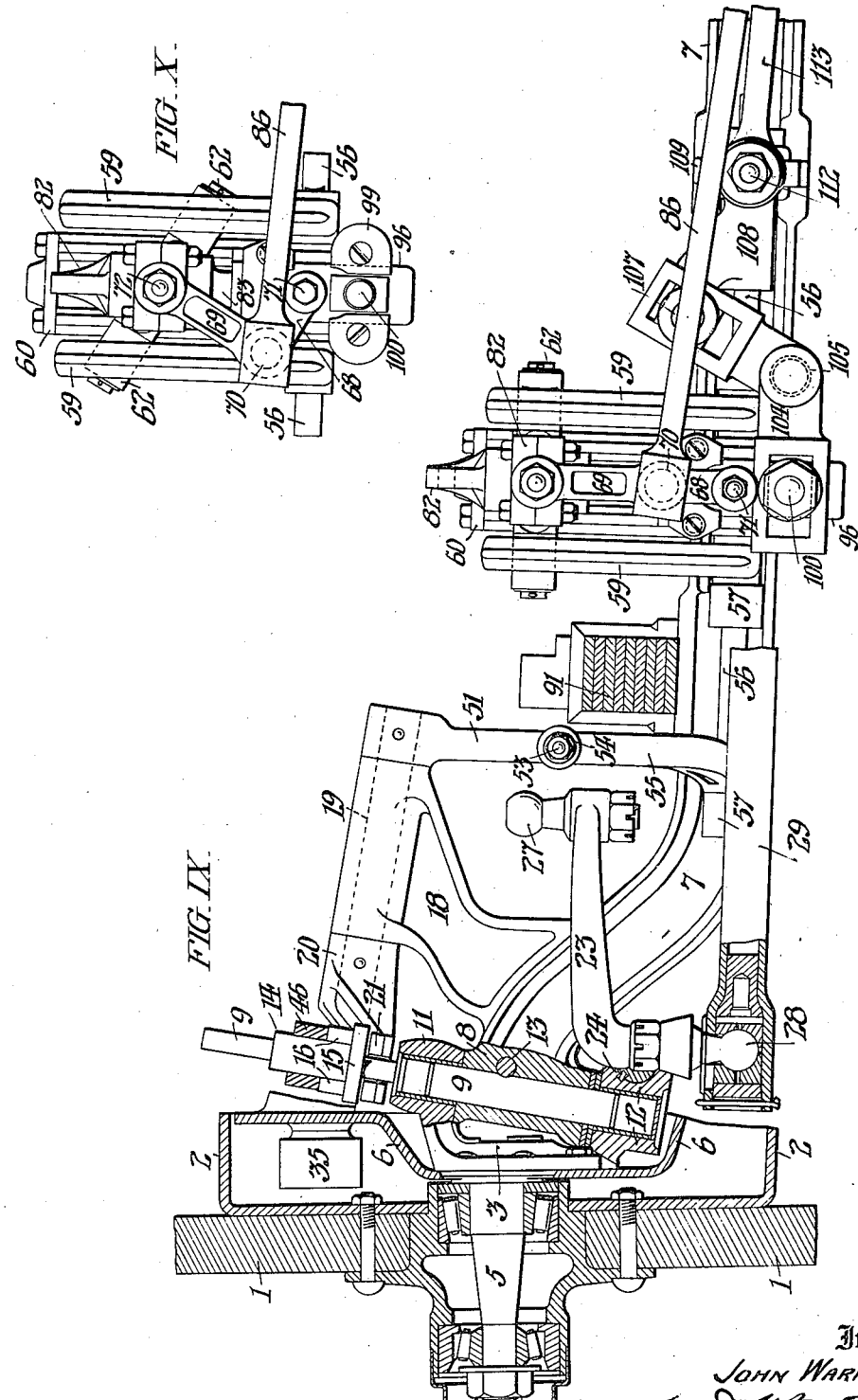

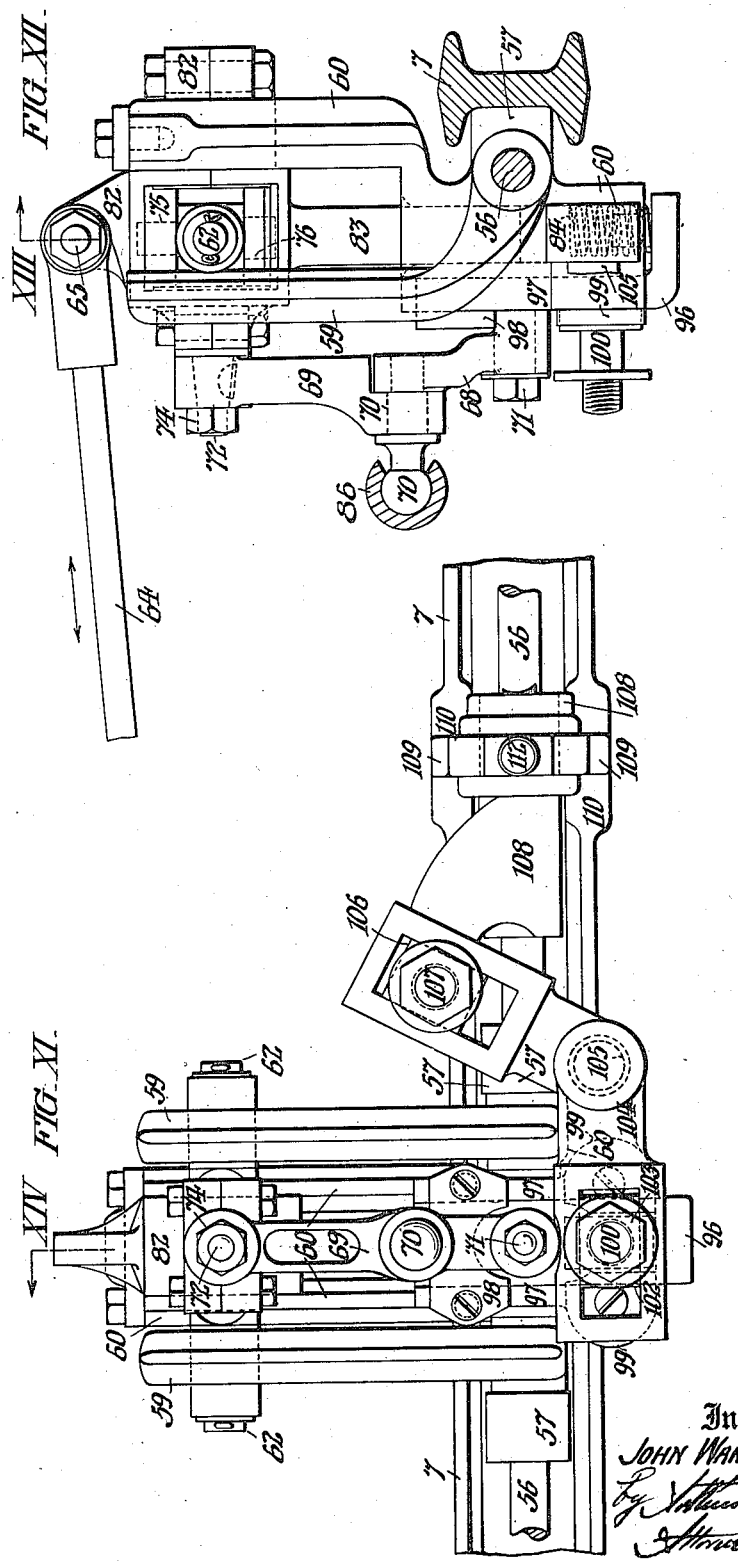

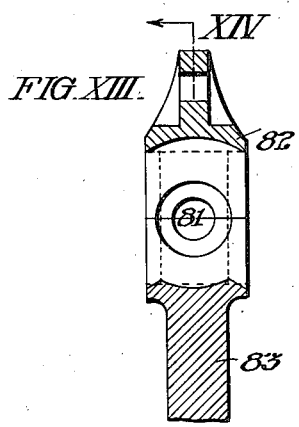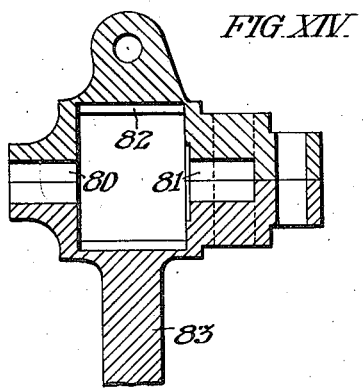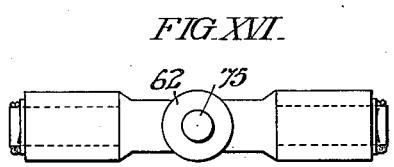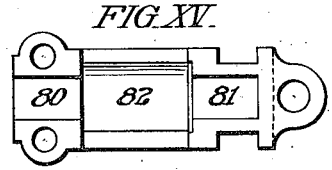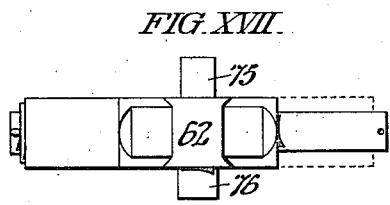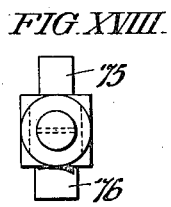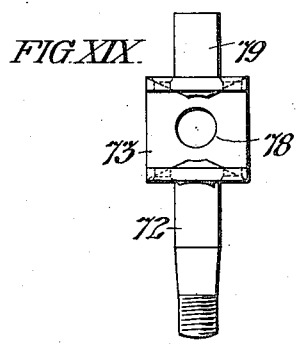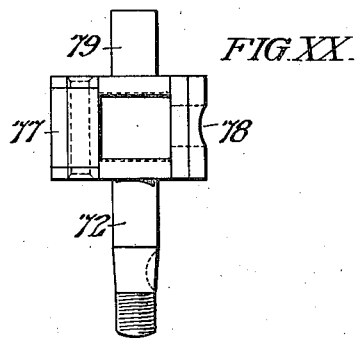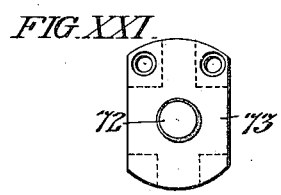

Patented Nov. 11, 1924.

1,515,310

UNITED STATES PATENT OFFICE.

JOHN WARREN MILLARD, OF UPPER DARBY, PENNSYLVANIA.

VEHICLE BRAKE MECHANISM.

Application filed June 20, 1924. Serial No. 721,153.

*To all whom it may concern:*

Be it known that I, JOHN WARREN MILLARD, a citizen of the United States, residing at Upper Darby, in the county of Delaware and State of Pennsylvania, have invented a certain new and useful Improvement in Vehicle Brake Mechanism, whereof the following is a specification, reference being had to the accompanying drawings.

My invention is applicable to dirigible road wheels of a vehicle provided with brake mechanism which may be operated regardless of the angular position of said wheels in relation to the vehicle body, and I have found it convenient to illustrate my invention with such brake mechanism of the generic form disclosed in Letters Patent of the United States 1,431,975 granted to me October 17, 1922. However, it is to be understood that my invention is not limited in its application to brake mechanism of that form.

Although an object and effect of my invention is to provide means for equalizing the braking effect upon the dirigible front wheels of an automobile, to such a degree that the application of the brakes to those wheels does not affect the steering of the vehicle as is the case if the brakes are unequally applied upon those wheels; my invention not only permits but, in one form thereof, automatically effects differential application of the brakes upon the front wheels of a vehicle, when such application is necessary or desirable. For instance, when the vehicle is traveling in a circular path, of course, the wheel which is nearer the axis of the circle of such path rotates at slower speed than the other and outer wheel, and it is preferable to apply the brakes more powerfully upon the wheel which is moving at the slower speed than upon the wheel which is moving at the greater speed. Moreover, there is what may be termed a shifting of the center of gravity of the load upon a vehicle, toward the front of a vehicle, when the speed of its traverse is checked, which throws a greater weight upon the front wheels than under normal conditions, when the vehicle is proceeding unchecked or is stationary, and it is desirable to apply the brakes to the front wheels with decreased power in accordance with such shift in the center of gravity of the load. Therefore, as hereinafter described, my invention includes means to not only permit, but automatically effect the application of the brakes with such decreased power, in accordance with such forward movement of the center of the load. In other words; the form of my invention hereinafter described includes means to automatically adjustably vary the application of the brakes upon the axially opposite wheels in accordance with any change in the direction of traverse of the vehicle; so that the brakes are applied most powerfully upon the wheel which is turning slower than the other, and less powerfully upon both wheels if and as the center of gravity of the vehicle tends to shift forward when the speed of traverse of the vehicle is suddenly checked; but such mechanism is continually subject to control by the operator who may, manually, vary the leverage of application of the brakes upon the axially opposite wheels simultaneously and equally or differentially.

In the form of my invention hereinafter described, the front wheels have brake drums respectively rigidly connected in coaxial relation therewith, and said drums are provided with brake shoes arranged to be operated by brake levers respectively carried by the steering knuckles upon which said wheels are dirigible; sleeves are mounted to slide vertically on the pintles which form the pivots of said steering knuckles in connection with the axle, and said sleeves couple said brake levers with levers fulcrumed on the axle; whereby the brakes may be operated in any angular position of said wheels with reference to said axle, by movement of the axle levers which effects sliding movement of said sleeves in respective coaxial relation with the pivots of said steering knuckles. In the form of my invention shown in said Letters Patent; the axle levers above contemplated were arranged to be independently operated by flexible connectors. In the form of my invention herein set forth; the axle levers for operation of the opposite dirigible wheels are provided with means to effect their operation simultaneously by a device which I term a differential lever, which may be adjustably varied either manually or automatically, or both, to determine the simultaneous movement of the brake levers of the respective wheels to either equalize such movement of the respective brake mechanism or simultaneously differentiate the application of the brake mechanism upon axially opposite wheels under the circumstances above contemplated. It is characteristic of that equalizer structure that what I term an equalizing lever, which is movable to apply the brakes, is fulcrumed between the two levers which are operatively connected with the respectively opposite wheel brake mechanism aforesaid, and said equalizing lever carries a cross head which connects said equalizing lever with both of said brake levers and is adjustable to vary the leverage upon said brake levers, either to increase or diminish such leverage equally upon both brake levers, or unequally, in accordance with the adjustment of said cross head; such adjustment being effected either manually or automatically by the means hereinafter described.

My invention includes the various novel features of construction and arrangement hereinafter more definitely specified.

In said drawings: Fig. I is a fragmentary transverse sectional view of parts of an automobile, including an elevation of the rear of the front axle, to which a convenient embodiment of my invention is applied; the arrangement being such that shifting of the load upon the chassis automatically effects adjustment of the equalizing lever mechanism, as above contemplated.

Fig. II is a fragmentary vertical longitudinal sectional view of the portion of an automobile shown in Fig. I, taken on the line II, II in that figure.

Fig. III is a fragmentary vertical sectional view, similar to Fig. I, but on a larger scale, showing a more complex means connecting the chassis with the brake mechanism.

Fig. IV is a fragmentary elevation of a modified form of the equalizing lever mechanism indicated in Fig. I and on a larger scale than that figure.

Fig. V is a fragmentary vertical sectional view showing a convenient form of mechanism by which tilting movement of the equalizing lever shown in Fig. I may be manually effected.

Fig. VI is a fragmentary vertical transverse sectional view, similar to Fig. I, but on a larger scale, and showing more of the brake mechanism and of a more complex form than Fig. I, but with the actuating rods omitted.

Fig. VII is a vertical longitudinal sectional view of the brake drum indicated in Fig. VI, taken on the line VII, VII in that figure; said drum being connected with the left hand front wheel of the vehicle.

Fig. VIII is an elevation of the brake drum and its appurtenances indicated in Fig. I, but from an axially opposite view point; Fig. VIII being a view of said drum from the right hand side of Fig. VI.

Fig. IX is a view similar to Fig. VI, but with parts of the drum and its appurtenances broken away to show the interior construction, and with the differential actuating rod added at the right hand side thereof.

Fig. X is a fragmentary rear elevation of the equalizing and differential lever mechanism, shown in Figs. VI and IX, but with the differential mechanism in the position corresponding with Fig. I.

Fig. XI is a fragmentary rear elevation of said equalizing and differential lever mechanism as shown in Figs. VI and IX, but on a larger scale.

Fig. XII is a right hand side elevation of parts of said mechanism shown in Fig. XI, showing the relation of the same to the front axle of the vehicle.

Fig. XIII is a fragmentary vertical sectional view of the radially reciprocatory slide bearing of the differential lever, taken on the line XIII in Fig. XII.

Fig. XIV is a fragmentary vertical sectional view of said bearing shown in Fig. XIII, taken on the line XIV in Figs. XI and XIII.

Fig. XV is a plan view of the lower portion of said bearing which is split horizontally as shown in Figs. XIII and XIV.

Fig. XVI is a plan view of the differential lever cross head shown in Figs. VI and IX to XII inclusive, with the antifriction roller journaled on the left hand end thereof. Fig. XVII is a rear elevation of said cross head and roller shown in Fig. XVI. Fig. XVIII is an elevation of the right hand end of said cross head, as shown in Fig. XVII. Fig. XIX is a plan view of the universal bearing for said cross head; wherein said cross head is mounted for oscillation upon axes at right angles to each other. Fig. XX is a right hand side elevation of said universal bearing, as shown in Fig. XIX; but which is mounted in said bearing shown in Figs. XIII and XIV, with its major axis extending horizontally, as shown in Figs. XI and XII. Fig. XXI is a rear end elevation of said universal bearing shown in Figs. XIX and XX. Fig. XXII is a fragmentary sectional view of the steering knuckle disk shown in Fig. IX; showing the oblique bearing for the brake cam lever. Fig. XXIII is a detached elevation of the brake lever arm and spring shown assembled in Fig. VIII.

In said figures; each road wheel 1 is provided with a hollow cylindrical drum flange 2 rigidly connected therewith in coaxial relation with the axis of rotation of said wheel. Each steering knuckle 3 has an axial spindle 5 of the usual conical form, upon which said wheel is mounted to rotate, and has the disk 6 in coaxial relation with said drum flange 2, forming a closure for the space within the latter. The axle member 7 has the vertical pintle bearing 8 and the pintle 9 extends in said bearing and projects above and below it, forming the pivot of said knuckle. Said pintle extends through the bracket bearings 11 and 12 on said knuckle 3 but is rigidly connected with said pintle bearing 8, conveniently by the cross pin or bolt 13. The slide sleeve 14 is mounted for vertical reciprocation on the upper portion of said pintle 9 and has the circumferential lifting flange 15 at the bottom thereof and transversely extending pivot lugs 16 above said flange.

Said axle member 7 has a pair of rock shaft bearing standards 18 respectively adjoining said pintle bearings 8, and in rigid relation therewith at the respectively opposite sides of the vehicle. A pair of rock shafts 19 are respectively journaled in said bearings 18 and each of said shafts carries, at its outer end, a sleeve lifter lever arm 20 rigidly connected therewith. As best shown in Fig. VIII, each lifter arm 20 is bifurcated at its distal end so that its bifurcations 21 extend upon respectively opposite sides of the pintle 9 and are arched so as to bear upon said lifting flange 15 to lift said sleeves 14 when said rock shafts 19 are turned in the direction of the arrow marked thereon in Fig. VIII; regardless of the angular position of the wheels 1 with reference to said axle 7, which is variably determined by the position of the steering knuckle arm 23, best shown in Fig. VIII, which is rigidly connected with said knuckle 3 at said pintle bearing 12, conveniently by the key 24 indicated in Fig. IX and the nut 25 shown in Fig. VIII. Said arm 23, shown in Figs. VIII and IX, has the ball bearing stud 27 at its inner end for connection with an ordinary steering drag link and also has the ball bearing stud 28 for connection with the cross rod 29 which couples the two axially opposite steering knuckles 3.

Each of said drums 2 incloses a pair of semiannular brake shoes 30 respectively pivoted upon studs 31 which are rigidly connected with said disk 6 near the bottom thereof, as best shown in Fig. VII. Said brake shoes 30 have slots 32 engaging the respective guide studs 34 which are also rigidly connected with said disk 6. The double faced cam 35 is rigidly connected with the end of the rock shaft 36 and fitted between the free ends of said brake shoes 30, as shown in Fig. VII, to force them into frictional engagement with said brake drum flange 2 when said rock shaft 36 is turned in the direction of the arrow marked on said cam in Fig. VII. Such movement is effected against the tension of the springs 37 which extend between respective studs 38 rigidly connected with said brake shoes 30 and which continually tend to release said brake shoes and restore them to the idle position shown in Fig. VII. Said rock shaft 36 is journaled in the stationary bearing 33 on said steering knuckle disk 6, best shown in Fig. XXII, and has the lever arm 39 rigidly connected therewith, conveniently by the key 40. The brake cam lever 41 is fitted to turn freely on said bearing 33, in the oblique plane indicated by the dash line in Fig. XXII, but has the bolt 42 extending through its arm 43 against said lever arm 39, and said bolt is adjustably rigidly connected with said cam lever 41 by the jam nut 45; whereby said cam lever 41 may be adjusted in variable angular relation with said cam 35 to compensate for wear upon said cam, flange 2, and parts of said brake shoes 30 contiguous thereto. Said cam lever 41 has a pair of downwardly curved fingers 46 at the free end thereof, embracing said sleeve 14 and engaging said pivot lugs 16; whereby, movement of said rock shafts 19, in the direction of the arrow marked thereon in Fig. VIII, causes said brake shoes 30 to frictionally engage their respective drum flanges 2 and thus apply the brake mechanism to check the rotation of said wheels 1. When the upward strain upon said sleeves 14 is released, said sleeves and the parts connected therewith are drawn downward by respective springs 48 which extend from said lever arms 39 to respective studs 49 on said disks 6; such springs 48 supplementing the action of the springs 37.

Each of said rock shafts 19 has, rigidly connected with its inner end, a pendant lever arm 51, engaging the adjustable ball connection 52 on a tractor link 53 having its opposite end provided with an adjustable ball connection 54 engaging an upwardly extending tractor lever 55. Two such tractor levers 55 are mounted upon the respective distal ends of rock shafts 56 which are axially alined in bearings 57 on said axle member 7 but may be rocked independently of each other, as hereinafter described. Upwardly extending tappet levers 59 are respectively rigidly connected with said alined rock shafts 56 at their adjacent ends and upon respectively opposite sides of the differential lever 60, which is fulcrumed in coaxial relation with said alined rock shafts 56, between said tappet levers 59. The cross head 62 is carried by said differential lever 60 and is tiltable, transversely to the wheels, in variable cooperative relation with both said tappet levers 59. As indicated in Figs. V and XII; a tractor 64 is pivotally connected to the free end of said differential lever 60 at 65 and provided with means, for instance, the lever 66, arranged to manually operate said lever 60 and thereby apply said brake shoes to both wheels 1, contemporaneously.

However, said differential lever 60 is provided with means arranged to effect differential movement of said tappet levers 59 and consequent differential application of said brake shoes 30 of the respective wheels 1, including a pair of toggle levers 68 and 69 carried by said differential lever and pivoted together by the ball stud 70 which, as indicated in Fig. XII, is rigidly mounted in the shorter toggle lever 68, but turns freely in the longer toggle lever 69. The lower end of said shorter toggle lever 68 is fulcrumed on the stud bolt 71 rigidly connected with the toggle slide 96 carried by said differential lever 60, as hereinafter described. The upper end of said longer toggle lever 69 is rigidly connected to the outer end of the trunnion 72 of the universal bearing 73 in which said cross head 62 is mounted; said trunnion having a conical portion extending through said lever 69 and having the clamp nut 74 exterior to said lever; whereby the opposite ends of said cross head, respectively cooperating with said two tappet levers 59, may be tilted, altitudinally, toward and away from the coaxial fulcrum of said levers, which is the common axis of said rock shafts 56, to vary the effective radial extent of said tappet levers 59, with consequent variation in the application of the brake mechanisms respectively connected with said rock shafts 56. For that purpose; said cross head 62 is so constructed and arranged that it is not only capable of movement toward and away from said rock shafts 56, but of universal movement with respect to a pivot point at its center, as follows:

As shown in Figs. XVI, XVII and XVIII; said cross head 62 has vertical, axially alined, trunnions 75 and 76 which are journaled in the respective upper and lower members 77 and 78 of said universal bearing 73, which is shown in Figs. XIX to XXI inclusive and which includes trunnions 72 and 79 having a common axis which is substantially horizontal and intersects the substantially vertical axis of said cross head trunnions 75 and 76. Said universal bearing trunnions 72 and 79 are respectively journaled in the bearings 80 and 81 of the cross head housing 82 of said differential lever 60. Said housing 82 is mounted for vertical reciprocation in said lever 60 and has, beneath its shank 83, the spring 84, carried by said slide 96, tending to straighten out said levers 68 and 69 to the position shown in Figs. XI and XII, wherein the cross head 62 is at the extreme upper limit of its movement and with its axis parallel with the axis of oscillation of said tappet levers 59 and differential lever 60. It is to be understood that said cross head 62 is thus afforded freedom for substantially universal movement upon the transversely related axes of said trunnions in and of said universal bearing 73, and also has freedom as indicated in Figs. XVI and XVII, for bodily movement toward and away from the common axis of said levers 59 and 60.

Referring to Figs. I and XII; the angular relation of said toggle levers 68 and 69 may be varied, to tilt said universal bearing 73, and thus tilt said cross head 62 in a substantially vertical plane, by two distinct means, viz., first, the connecting rod 86 which engages said ball stud 70 carried by the toggle lever 68 and has its opposite end pivotally connected with the front steering knuckle arm 85; and, second, by the crank lever 87 which is journaled in the bearing 88 on said axle member 7 and is connected by the link 89 with the chassis frame 90, conveniently at the right hand side thereof, as indicated in Fig. I; said chassis being connected with the axle member 7 by the springs 91, one of which is shown in section in Fig. VI. It is to be understood that the effect of such connection is to tilt said cross head 62 downward toward the right when said wheels 1 are turned to the left, and to lower said head when said chassis frame 90 is tilted downward, by the aforesaid shifting of the center of gravity of the load forwardly on said frame, as the forward motion of the vehicle is checked.

Of course, change in the angular position of said toggle levers 68 and 69, from the position shown in Fig. IX, to the position shown in Fig. X, lowers the center of oscillation of said cross head 62, ultimately against the pressure of said spring 84, indicated in Fig. XII, which tends to uplift the same as above noted, and the effect of such adjustment is to render the movement of the brake tractor 64 in the direction of the arrow shown on Fig. XII different in its effect upon the two tappet levers 59 and, consequently, different in braking effect upon the axially opposite wheels 1 because, as indicated in Fig. X, such movement varies the effective radius of said tappet levers 59 at which the power thus imparted to said cross head 62 is applied to said levers. For instance, in the position shown in Fig. X; movement of the differential lever 60 toward the observer effects a greater leverage against the tappet lever 59 at the left hand side of said figure than of the tappet lever 59 at the right hand side of said figure (as indicated in Fig. V,) with consequent differential turning movement of the respective rock shafts 56 and corresponding differential operation of the brake mechanisms connected therewith and leading to the respectively opposite wheels, as above described.

In the form of my invention shown in Fig. I, the lower toggle lever 68 is fulcrumed on the stud 71 upon the slide 96 which is connected in vertically movable relation with the lever 60, so that downward movement of the cross head housing 82 and consequent variation in the effective leverage of said tappet levers 59, by vertical movement of said stud 71, is incident to the downward displacement of the chassis 90. However, other means may be employed to raise and lower said fulcrum stud 71 with respect to said lever 60, to thus vary the effective length of said levers 59. For instance, as indicated in Fig. IV, said stud 71 may be carried at the distal end of the lower arm of a bell crank lever 92 which is fulcrumed upon the stud 93 rigidly connected with said lever 60, and the upper arm of said lever 92 pivotally connected at 94 with the connecting rod 95, either leading to said lever 87 or to manually operative means. It is to be understood that the construction and arrangement shown in Fig. IV are such that the effective radius of said tappet levers 59 with respect to said cross head 62 may be thus varied, by movement of said rod 95, either simultaneously with, or independently of, the automatic variation effected by movement of said connecting rod 86.

However, I have shown more elaborate means for raising and lowering said fulcrum stud 71, in Figs. I, XI and XII, wherein said stud 71 is rigidly connected with the toggle slide 96 which is held, for vertical reciprocation, between the parallel guide flanges 97 on said lever 60, by the cross plates 98 and 99. Said slide has the screw stud 100 rigidly extending therefrom through the slide block 102, which is free to turn on said stud but is held, by the nut 103, in the lower arm of the bell crank lever 104. Said lever is fulcrumed upon the screw stud 105 which is rigidly connected with a lug on said lever 60, indicated in Figs. XI and XII. The upper arm of said lever 104 engages the slide block 106 which is free to turn upon the screw stud 107 which is rigidly connected with the sleeve 108. Said sleeve 108 is mounted to turn freely on the right hand rock shaft 56 within the slide block 109 which has a plane face bearing upon the plane pads 110 of said axle member 7, so as to prevent said block from turning. As shown in Figs. VI, IX and XI; said block 109 has the rigidly projecting pivot stud 112, engaging the inner end of the connecting rod 113; whereby said sleeve 108 may be reciprocated to rock said lever 104 and thereby raise and lower said cross head 62 to vary the effective leverage of said tappet levers 59. Fig. VI shows said cross head 62, in full lines, thus raised to the upper limit of its movement by said lever 104 and also indicates a lower position thereof by dotted lines. As shown in Fig. XII, I find it convenient to extend said toggle slide 96 beneath said lever 60 to support said spring 84 beneath the shank 83 of the universal bearing housing 82; so that said spring tends to uplift said housing from its lower position indicated in Fig. I to which it is drawn down by the displacement of said toggle levers 68 and 69 from their normal vertical alinement. Said connecting rod 113 may be automatically operated by said lever 87, as shown in Fig. I, or be connected with means whereby the power applied to said tappet levers 59 and thence to the respective wheel brakes may be varied at the will of the operator, either independently of or contemporaneously with the automatic variation above contemplated with reference to Fig. I.

In Figs. I and II, the link 89 being directly pivotally connected with the chassis frame 90, both movements of the axle 7 and said chassis 90 toward and away from each other are imparted to the brake actuating lever 87 shown in that figure. However, as shown in Fig. III, I may provide said chassis with means, including the abutment 114 to operate said lever 87 only by movements of said chassis and axle toward each other; the link 89 being pivotally connected at its upper end to the bell crank lever 115 which is fulcrumed at 116 on the chassis frame member 90 with which it is connected by the spring 117. It may be observed that said spring 117 constantly tends to shift the connecting rod 113 to the right and thus bring the toggle levers 68 and 69 to their normal vertical position. However, such movement may be adjustably limited by the set screw 118 which extends through the lug 119 which is in rigid relation with said axle member 7.

Although I have found it convenient to show and describe my invention with reference to a front axle and dirigible wheels mounted thereon it is to be understood that my invention may be applied in connection with a rear axle either having such dirigible wheels or wheels which are continually maintained in coaxial relation. Therefore, I do not desire to limit myself to the precise details of construction and arrangement herein set forth, as it is obvious that various modifications may be made therein without departing from the essential features of my invention, as defined in the appended claims.

I claim:

1. In vehicle brake mechanism; the combination with a pair of front dirigible road wheels; of respective brake drums rigidly connected with said wheels; respective pairs of substantially semicircular brake shoes each pivoted at one end and fitted to frictionally engage the surface of said drums; respective cams fitted to operate the free ends of said brake shoes; a pair of steering knuckles, each having an axle spindle upon which one of said wheels is journaled; respective pintles downwardly inclined away from each other and forming the pivots of said knuckles; an axle member having knuckle bearings at its opposite ends respectively engaging said pintles; respective slide sleeves arranged to reciprocate on the axes of said pintles; spring means arranged to normally hold said sleeves in position to release said shoes; respective brake levers engaging said sleeves and arranged to operate said shoes; and means arranged to slide said sleeves to apply said brake shoes, including a pair of rock shafts, respectively inwardly downwardly inclined, each in right angular relation to the adjacent pintle; each of said shafts having two lever arms, one extending laterally and engaging the adjacent sleeve and the other pendent; a pair of axially alined rock shafts, carried by said axle member; upwardly extending tractor levers, respectively rigidly connected with said alined rock shafts at their distal ends; tractors respectively connecting said pendent arms with said tractor levers; upwardly extending tappet levers, respectively rigidly connected with said alined rock shafts at their adjacent ends; a differential lever, fulcrumed in coaxial relation with said alined rock shafts, between said tappet levers; a cross head carried by said differential lever and tiltable, transversely to the vehicle, in variable cooperative relation with both said tappet levers; a tractor pivotally connected to the free end of said differential lever, and arranged to manually operate it and thereby apply said brake shoes to both wheels, contemporaneously; and means arranged to effect differential movement of said tappet levers and consequent differential application of said shoes of the respective wheels, including a pair of toggle levers, carried by said differential lever, one shorter than the other, and pivoted together; the lower end of said shorter lever being fulcrumed on said differential lever, and the upper end of the longer toggle lever being rigidly connected to said cross head and arranged to tilt it; whereby the opposite ends of said cross head, respectively cooperating with said two tappet levers, may be tilted toward and away from their coaxial fulcrum to vary their relative effective length; and means operatively connecting said toggle levers with the vehicle chassis; arranged to change their position, with consequent differential effect in the application of the brakes upon the respective wheels, in accordance with any change in the direction of traverse of the vehicle, so that the brakes are applied most powerfully upon the wheel which is turning slower than the other, and less powerfully upon both front wheels if and as the center of gravity of the vehicle body and its load tends to shift forward when the speed of traverse of the vehicle is suddenly checked.

2. In vehicle brake mechanism; the combination with a pair of dirigible road wheels; of respective brake drums connected with said wheels; respective pairs of brake shoes each pivoted at one end and fitted to frictionally engage the surface of said drums; respective cams fitted to operate the free ends of said brake shoes; a pair of steering knuckles, each having an axle spindle upon which one of said wheels is journaled; respective pintles forming the pivots of said knuckles; an axle member having knuckle bearings at its opposite ends respectively engaging said pintles; respective slide sleeves arranged to reciprocate on the axes of said pintles; spring means arranged to normally hold said sleeves in position to release said shoes; respective brake levers engaging said sleeves and arranged to operate said shoes; and means arranged to slide said sleeves to apply said brake shoes, including a pair of levers each having two arms, one extending laterally and engaging the adjacent sleeve and the other pendent; a pair of rock shafts, carried by said axle member; upwardly extending tractor levers, respectively rigidly connected with said rock shafts at their distal ends; tractors respectively connecting said pendent arms with said tractor levers; tappet levers, respectively rigidly connected with said rock shafts at their adjacent ends; a differential lever; fulcrumed between said tappet levers; a cross head carried by said differential lever and tiltable, transversely to the vehicle, in variable cooperative relation with both said tappet levers; a tractor connected to the free end of said differential lever, and arranged to operate it and thereby apply said brake shoe to both wheels, contemporaneously; and means arranged to effect differential movement of said tappet levers and consequent differential application of said shoes of the respective wheels, including a pair of toggle levers, carried by said differential lever and pivoted together; the lower end of one toggle lever being fulcrumed on said differential lever, and the upper end of the other toggle lever being rigidly connected to said cross head and arranged to tilt it; whereby the opposite ends of said cross head, respectively cooperating with said two tappet levers, may be tilted toward and away from their coaxial fulcrum to vary their relative effective length; and means operatively connected with said toggle levers; arranged to change their position, with consequent differential effect in the application of the brakes upon the respective wheels, in accordance with any change in the direction of traverse of the vehicle, so that the brakes are applied most powerfully upon the wheel which is turning slower than the other.

3. In vehicle brake mechanism; the combination with a pair of dirigible road wheels; of respective brake drums connected with said wheels; respective brakes fitted to frictionally engage the surface of said drums; respective cams fitted to operate said brakes; a pair of steering knuckles, each having an axle spindle upon which one of said wheels is journaled; respective pintles forming the pivots of said knuckles; an axle member having knuckle bearings at its opposite ends respectively engaging said pintles; respective slide sleeves arranged to reciprocate on the axes of said pintles; spring means arranged to normally hold said sleeves in position to release said brakes; respective brake levers engaging said sleeves and arranged to operate said brakes; and means arranged to slide said sleeves to apply said brakes, including a pair of levers each having two arms, one extending laterally and engaging the adjacent sleeve and the other pendent; a pair of rock shafts, carried by said axle member; tractor levers, respectively rigidly connected with said rock shafts at their distal ends; tractors respectively connecting said pendent arms with said tractor levers; tappet levers, respectively rigidly connected with said rock shafts; a differential lever, fulcrumed between said tappet levers; a cross head carried by said differential lever and tiltable, in variable cooperative relation with both said tappet levers; operating means connected to said differential lever, and arranged to operate it and thereby apply said brakes to both wheels, contemporaneously; and means arranged to effect differential movement of said tappet levers and consequent differential application of said brakes of the respective wheels, including a pair of toggle levers, carried by said differential lever, and pivoted together; one of said toggle levers being rigidly connected to said cross head and arranged to tilt it; whereby the opposite ends of said cross head, respectively cooperating with said two tappet levers, may be tilted to vary their relative effective length; and means operatively connecting said cross head with the vehicle chassis; arranged to change its position, with consequent differential effect in the application of the brakes upon the respective wheels, in accordance with any change in the direction of traverse of the vehicle; so that the brakes are applied most powerfully upon the wheel which is turning slower than the other, and less powerfully upon both wheels if and as the center of gravity of the vehicle tends to shift forward when the speed of traverse of the vehicle is suddenly checked.

4. In vehicle brake mechanism; the combination with a pair of dirigible road wheels; of respective brake drums rigidly connected with said wheels; respective brakes fitted to frictionally engage the surface of said drums; a pair of steering knuckles, each having an axle spindle upon which one of said wheels is journaled; respective pintles forming the pivots of said knuckles; an axle member having knuckle bearings at its opposite ends respectively engaging said pintles; respective slide sleeves arranged to reciprocate on the axes of said pintles; spring means arranged to normally hold said sleeves in position to release said brakes; respective brake levers engaging said sleeves and arranged to operate said brakes; and means arranged to slide said sleeves to apply said brakes, including a pair of levers each having two arms, one extending laterally and engaging the adjacent sleeve and the other pendent; a pair of rock shafts, carried by said axle member; tractor levers, respectively rigidly connected with said rock shafts; tractors respectively connecting said pendent arms with said tractor levers; tappet levers, respectively rigidly connected with said rock shafts at their adjacent ends; a differential lever, fulcrumed in coaxial relation with said alined rock shafts, between said tappet levers; a cross head carried by said differential lever and tiltable, in variable cooperative relation with both said tappet levers; operating means connected to said differential lever, and arranged to operate it and thereby apply said brakes to both wheels, contemporaneously; and means arranged to effect differential movement of said tappet levers and consequent differential application of said brakes of the respective wheels, including means whereby the opposite ends of said cross head, respectively cooperating with said two tappet levers may be tilted to vary their relative effective length; and means arranged to change the position of said cross head with consequent differential effect in the application of the brakes upon the respective wheels, in accordance with any change in the direction of traverse of the vehicle, so that the brakes are applied most powerfully upon the wheel which is turning slower than the other, and less powerfully upon both wheels if and as the center of gravity of the vehicle tends to shift when the speed of traverse of the vehicle is suddenly checked.

5. In vehicle brake mechanism; the combination with a pair of dirigible road wheels; of respective brake drums rigidly connected with said wheels; respective brakes fitted to frictionally engage the surface of said drums; a pair of steering knuckles, each having an axle spindle upon which one of said wheels is journaled; respective pintles forming the pivots of said knuckles; an axle member having knuckle bearings at its opposite ends respectively engaging said pintles; respective slide sleeves arranged to reciprocate on the axes of said pintles; spring means arranged to normally hold said sleeves in position to release said brakes; respective brake levers engaging said sleeves and arranged to operate said brakes; and means arranged to slide said sleeves to apply said brakes, including a pair of levers each having two arms, one extending laterally and engaging the adjacent sleeve and the other pendent; a pair of rock shafts, carried by said axle member; tractor levers, respectively rigidly connected with said rock shafts; tractors respectively connecting said pendent arms with said tractor levers; tappet levers, respectively rigidly connected with said rock shafts at their adjacent ends; a differential lever, fulcrumed in coaxial relation with said alined rock shafts, between said tappet levers; a cross head carried by said differential lever and tiltable, in variable cooperative relation with both said tappet levers; operating means connected to said differential lever, and arranged to operate it and thereby apply said brakes to both wheels, contemporaneously; and means arranged to effect differential movement of said tappet levers and consequent differential application of said brakes of the respective wheels, including means whereby the opposite ends of said cross head, respectively cooperating with said two tappet levers may be tilted to vary their relative effective length; and means arranged to change the position of said cross head with consequent differential effect in the application of the brakes upon the respective wheels, in accordance with any change in the direction of traverse of the vehicle, so that the brakes are applied most powerfully upon the wheel which is turning slower than the other.

6. In vehicle brake mechanism; the combination with a pair of road wheels; of respective brake drums rigidly connected with said wheels; respective brakes fitted to frictionally engage the surface of said drums; an axle member; respective brake levers carried by said axle member and arranged to operate said brakes; a pair of axially alined rocks shafts, carried by said axle member; tractor levers, respectively rigidly connected with said alined rock shafts; means connecting said brake levers with said tractor levers; tappet levers, respectively rigidly connected with said alined rock shafts; a differential lever, fulcrumed in coaxial relation with said alined rock shafts, between said tappet levers; a cross head carried by said differential lever and tiltable, in variable cooperative relation with both said tappet levers; operating means connected to said differential lever, and arranged to operate it and thereby apply said brakes to both wheels, contemporaneously; and means arranged to effect differential movement of said tappet levers and consequent differential application of said brakes of the respective wheels, including means whereby the opposite ends of said cross head, respectively cooperating with said two tappet levers may be tilted to vary their leverage; and means arranged to change the position of said cross head with consequent differential effect in the application of the brakes upon the respective wheels, in accordance with any change in the direction of traverse of the vehicle, so that the brakes are applied most powerfully upon the wheel which is turning slower than the other, and less powerfully upon both wheels if and as the center of gravity of the vehicle tends to shift when the speed of traverse of the vehicle is suddenly checked.

7. In vehicle brake mechanism; the combination with a pair of road wheels; of respective brake drums rigidly connected with said wheels; respective brakes fitted to frictionally engage the surface of said drums; an axle member; respective brake levers carried by said axle member and arranged to operate said brakes; a pair of axially alined rock shafts, carried by said axle member; tractor levers, respectively rigidly connected with said alined rock shafts; means connecting said brake levers with said tractor levers; tappet levers, respectively rigidly connected with said alined rock shafts; a differential lever, fulcrumed in coaxial relation with said alined rock shafts, between said tappet levers; a cross head carried by said differential lever and tiltable, in variable cooperative relation with both said tappet levers; operating means connected to said differential lever, and arranged to operate it and thereby apply said brakes to both wheels, contemporaneously; and means arranged to effect differential movement of said tappet levers and consequent differential application of said brakes of the respective wheels, including means whereby the opposite ends of said cross head, respectively cooperating with said two tappet levers may be tilted to vary their leverage; and means arranged to change the position of said cross head with consequent differential effect in the application of the brakes upon the respective wheels, in accordance with any change in the direction of traverse of the vehicle, so that the brakes are applied most powerfully upon the wheel which is turning slower than the other.

8. In vehicle brake mechanism; the combination with a pair of road wheels; of respective brake drums rigidly connected with said wheels; respective brakes fitted to frictionally engage the surface of said drums; an axle member; respective brake levers carried by said axle member and arranged to operate said brakes; a pair of axially alined rock shafts, carried by said axle member; tractor levers, respectively rigidly connected with said alined rock shafts; means connecting said brake levers with said tractor levers; tappet levers, respectively rigidly connected with said alined rock shafts; a differential lever, fulcrumed in coaxial relation with said alined rock shafts, between said tappet levers; a cross head carried by said differential lever and tiltable, in variable cooperative relation with both said tappet levers; operating means connected to said differential lever, and arranged to operate it and thereby apply said brakes to both wheels, contemporaneously; and means arranged to effect differential movement of said tappet levers and consequent differential application of said brakes of the respective wheels, including means whereby the opposite ends of said cross head, respectively cooperating with said two tappet levers may be tilted to vary their leverage; and means arranged to change the position of said cross head with consequent differential effect in the application of the brakes upon the respective wheels.

9. In vehicle brake mechanism, the combination with a pair of road wheels; of respective brake mechanisms for said wheels; a pair of axially alined rock shafts; means operatively connecting said rock shafts respectively with said wheel brake mechanisms; tappet levers, respectively rigidly connected with said alined rock shafts; a differential lever, fulcrumed in coaxial relation with said alined rock shafts, between said tappet levers; a cross head carried by said differential lever and tiltable, in variable cooperative relation with both said tappet levers; operating means connected to said differential lever and arranged to operate it and thereby apply said brakes to both wheels, contemporaneously; means arranged to effect differential movement of said tappet levers and consequent differential application of said brakes of the respective wheels, including means whereby the opposite ends of said cross head, respectively cooperating with said two tappet levers, may be tilted to vary their leverage; and means arranged to change the position of said cross head with consequent differential effect in the application of the brakes upon the respective wheels, in accordance with change in the direction of traverse of the vehicle.

10. In vehicle brake mechanism, the combination with a pair of road wheels; of respective brake mechanisms for said wheels; a pair of axially alined rock shafts; means operatively connecting said rock shafts respectively with said wheel brake mechanisms; tappet levers, respectively rigidly connected with said alined rock shafts; a differential lever, fulcrumed in coaxial relation with said alined rock shafts, between said tappet levers; a cross head carried by said differential lever and tiltable, in variable cooperative relation with both said tappet levers; operating means connected to said differential lever and arranged to operate it and thereby apply said brakes to both wheels, contemporaneously; means arranged to effect differential movement of said tappet levers and consequent differential application of said brakes of the respective wheels, including means whereby the opposite ends of said cross head, respectively cooperating with said two tappet levers, may be tilted to vary their leverage.

11. In vehicle brake mechanism, the combination with a pair of road wheels; of respective brake mechanisms for said wheels; a pair of axially alined rock shafts; means operatively connecting said rock shafts respectively with said wheel brake mechanisms; tappet levers, respectively rigidly connected with said alined rock shafts; a differential lever, fulcrumed in coaxial relation with said alined rock shafts, between said tappet levers; a cross head carried by said differential lever and tiltable, in variable cooperative relation with both said tappet levers; operating means connected to said differential lever and arranged to operate it and thereby apply said brakes to both wheels, contemporaneously; means arranged to effect differential movement of said tappet levers and consequent differential application of said brakes of the respective wheels, including means whereby the opposite ends of said cross head, respectively cooperating with said two tappet levers, may be tilted to vary their leverage; and means arranged to change the position of said cross head with consequent differential effect in the application of the brakes upon the respective wheels.

12. In vehicle brake mechanism, the combination with a pair of road wheels; of respective brake mechanisms for said wheels; a pair of axially alined rock shafts; means operatively connecting said rock shafts respectively with said wheel brake mechanisms; tappet levers, respectively rigidly connected with said alined rock shafts; a differential lever, fulcrumed in coaxial relation with said alined rock shafts, between said tappet levers; a cross head carried by said differential lever and tiltable, in variable cooperative relation with both said tappet levers; operating means connected to said differential lever and arranged to operate it and thereby apply said brakes to both wheels, contemporaneously.

13. In vehicle brake mechanism, the combination with a pair of road wheels; of respective brake mechanisms for said wheels; a pair of axially alined rock shafts; means operatively connecting said rock shafts respectively with said wheel brake mechanisms; tappet levers, respectively rigidly connected with said alined rock shafts; a differential lever, fulcrumed in coaxial relation with said alined rock shafts, between said tappet levers; a cross head carried by said differential lever and tiltable, in variable cooperative relation with both said tappet levers; operating means connected to said differential lever and arranged to operate it and thereby apply said brakes to both wheels, contemporaneously; means arranged to effect differential movement of said tappet levers and consequently differential application of said brakes of the respective wheels, including means whereby said cross head may be automatically moved toward and away from the fulcrum of said tappet levers, to vary their leverage, in accordance with change in the center of gravity of the vehicle.

14. In vehicle brake mechanism, the combination with a pair of road wheels; of respective brake mechanisms for said wheels; a pair of axially alined rock shafts; means operatively connecting said rock shafts respectively with said wheel brake mechanisms; tappet levers, respectively rigidly connected with said alined rock shafts; a differential lever, fulcrumed in coaxial relation with said alined rock shafts, between said tappet levers; a cross head carried by said differential lever and tiltable, in variable cooperative relation with both said tappet levers; operating means connected to said differential lever and arranged to operate it and thereby apply said brakes to both wheels, contemporaneously; means arranged to effect differential movement of said tappet levers and consequent differential application of said brakes of the respective wheels, including means whereby said cross head may be moved toward and away from the fulcrum of said tappet levers, to vary their leverage.

15. In vehicle brake mechanism, the combination with a pair of road wheels; of respective brake mechanisms for said wheels; a pair of tappet levers; means operatively connecting said levers respectively with said wheel brake mechanism; a differential lever, fulcrumed in coaxial relation with said tappet levers; a cross head carried by said differential lever and tiltable, in variable cooperative relation with both said tappet levers; operating means connected to said differential lever and arranged to operate it and thereby apply said brakes to both wheels, contemporaneously; means arranged to effect differential movement of said tappet levers and consequent differential application of said brakes of the respective wheels, including means whereby the opposite ends of said cross head, respectively cooperating with said two tappet levers, may be tilted to vary their leverage.

16. In vehicle brake mechanism, the combination with a pair of load wheels; of respective brake mechanisms for said wheels; a pair of tappet levers; means operatively connecting said levers respectively with said wheel brake mechanisms; tappet levers, respectively rigidly connected with said alined rock shafts; a differential lever, fulcrumed in coaxial relation with said alined rock shafts, between said tappet levers; a cross head pivotally carried by said differential lever, in automatically variable cooperative relation with both said tappet levers; operating means connected to said differential lever and arranged to equally distribute the operating power to said tappet levers, by said cross head; and means arranged to effect differential movement of said tappet levers and consequent differential application of said brakes of the respective wheels, including means whereby the opposite ends of said cross head, respectively cooperating with said two tappet levers, may be tilted to vary their leverage.

17. In vehicle brake mechanism, the combination with a pair of road wheels; of respective brake mechanisms for said wheels; a pair of tappet levers; means operatively connecting said levers respectively with said wheel brake mechanisms; tappet levers, respectively rigidly connected with said alined rock shafts; a differential lever, fulcrumed in coaxial relation with said alined rock shafts, between said tappet levers; a cross head pivotally carried by said differential lever, in automatically variable cooperative relation with both said tappet levers; and operating means connected to said differential lever and arranged to equally distribute the operating power to said tappet levers, by said cross head.

18. In vehicle brake mechanism, the combination with a pair of road wheels; of respective brake mechanisms for said wheels; a pair of tappet levers, respectively operatively connected with said wheel brake mechanisms; a differential lever; a cross head pivotally carried by said differential lever, in variable cooperative relation with both said tappet levers; and operating means connected to said differential lever and arranged to operate it and thereby apply said brakes to both wheels, contemporaneously.

19. In vehicle brake mechanism, the combination with a pair of road wheels; of respective brake mechanisms for said wheels; a pair of tappet levers, respectively operatively connected with said wheel brake mechanisms; a pivoted cross head, in variable cooperative relation with both said tappet levers; operating means connected to said cross head and arranged to operate it and thereby apply said brakes to both wheels, contemporaneously; and means arranged to effect differential movement of said tappet levers and consequent differential application of said brakes of the respective wheels, including means whereby the opposite ends of said cross head, respectively cooperating with said two tappet levers, may be tilted to vary their leverage.

20. In vehicle brake mechanism, the combination with a pair of road wheels; of respective brake mechanisms for said wheels; a pair of tappet levers, respectively operatively connected with said wheel brake mechanisms; a pivoted cross head, in variable cooperative relation with both said tappet levers; and operating means connected to said cross head and arranged to operate it and thereby apply said brakes to both wheels, contemporaneously.

In testimony whereof, I have hereunto signed my name at Philadelphia, Pennsylvania, this sixteenth day of June, 1924.

JOHN WARREN MILLARD.

Witnesses:
CAROLINE E. REUTER,
HARRY A. MOSER.